United States Patent [19]

Pedicini

[11] Patent Number: 5,188,909
[45] Date of Patent: Feb. 23, 1993

[54] ELECTROCHEMICAL CELL WITH CIRCUIT DISCONNECT DEVICE

[75] Inventor: Christopher S. Pedicini, Marietta, Ga.

[73] Assignee: Eveready Battery Co., Inc., St. Louis, Mo.

[21] Appl. No.: 758,649

[22] Filed: Sep. 12, 1991

[51] Int. Cl.⁵ .................. H01M 10/50; H01M 2/02
[52] U.S. Cl. .......................................... 429/7; 429/62; 429/171
[58] Field of Search ............... 429/62, 54, 171, 172, 429/174, 7

[56] References Cited

U.S. PATENT DOCUMENTS

| | | | |
|---|---|---|---|
| 3,519,972 | 7/1970 | Merrill | 337/407 |
| 3,855,006 | 12/1974 | Kegelman | 136/177 |
| 4,001,754 | 1/1977 | Plasko | 337/407 |
| 4,008,354 | 2/1977 | Fitchman et al. | 429/56 |
| 4,075,595 | 2/1978 | Plasko | 337/407 |
| 4,084,147 | 4/1978 | Mlyniec et al. | 337/407 |
| 4,109,229 | 8/1978 | Plasko | 337/408 |
| 4,309,685 | 1/1982 | Candor | 337/408 |
| 4,314,224 | 2/1982 | Plasko | 337/408 |
| 4,397,919 | 8/1983 | Ballard | 429/53 |
| 4,792,503 | 12/1988 | Eppley | 429/181 |
| 4,855,195 | 8/1989 | Georgopoulos et al. | 429/54 |
| 4,943,497 | 7/1990 | Oishi et al. | 429/54 X |
| 4,975,341 | 11/1990 | Tucholski et al. | 429/62 |
| 4,992,339 | 2/1991 | Georgopoulos | 429/62 X |

FOREIGN PATENT DOCUMENTS 0125037  11/1984  European Pat. Off. .
60-249241  12/1985  Japan .

*Primary Examiner*—John S. Maples
*Attorney, Agent, or Firm*—Robert W. Welsh

[57] ABSTRACT

An electrochemical cell employing a safety disconnect device which employs a low melting heat fusible conductive material, such as solder, to secure an outwardly biased external conductive terminal to one terminal of the cell so that when the solder melts, the external conductive terminal is pushed away from the cell thereby breaking electronic contact with the cell.

20 Claims, 1 Drawing Sheet

ELECTROCHEMICAL CELL WITH CIRCUIT DISCONNECT DEVICE

FIELD OF THE INVENTION

The invention relates to an electrochemical cell employing a safety disconnect device which employs a heat fusible conductive material to electronically and physically secure an external conductive terminal to one terminal of the cell.

BACKGROUND OF THE INVENTION

Under abuse conditions, high energy density electrochemical cells can leak or rupture which can cause damage to the device employing the cell. Examples of abuse conditions for a cell are abuse charging of the cell, forced discharging and external shorting. Such conditions cause the internal temperature of the cell to rise with a corresponding increase in pressure. Although such cells typically employ a venting mechanism wherein the electrolyte is expelled, the electrolyte can itself cause damage. Additionally, in cells which employ lithium as an anode material, if internal cell temperatures reach above 180° C., the lithium can melt and result in a fire. Therefore, safety devices other than venting means which will disconnect the electrical circuit under abuse conditions are desirable. If the circuit can be disconnected, the rise in the cell's internal temperature and pressure as a result of the abuse conditions can be terminated.

Japanese patent application 85/249241 describes a hermetically sealed cell in which the metal cell container and cover are joined by a low melting metal alloy (solder) to form a temperature-sensitive venting means.

U.S. Pat. No. 3,855,066 discloses a nonaqueous lithium cell having an organic electrolyte and having an electrolyte expulsion vent in the cell container which vent opening is sealed with a heat fusible metal plug.

U.S. Pat. No. 4,397,919 discloses a thermal venting mechanism for a hermetically sealed non-cylindrical cell (e.g., a Li/SO$_2$ cell) which employs a low-melting plug (e.g., in the electrolyte fill tube) made of a material such as a metal alloy which will melt below the explosive temperature of the cell. In addition, a thermoplastic sphere may be seated within the opening below the metal plug to form a pressure-tight seal against the opening walls. The cell container is made of a flexible material which can distort in response to internal pressure increase. When excessive internal or external heating occurs, the thermoplastic sphere deforms and partially releases the internal pressure. At higher temperatures (and after the pressure-induced volume expansion has occurred) the metal plug melts and provides a direct vent to the atmosphere.

U.S. Pat. No. 4,008,354 discloses a vent means employing an extrudable hot melt adhesive material which fills a vent hole and also covers part of the container surface surrounding the vent hole. Under abnormal internal pressure conditions, the adhesive material is extruded through the vent hole to provide a vent path for pressure release.

European Patent No. 125037 discloses a glass-to-metal (GTM) sealed cell having a pressure- and temperature-sensitive vent structure. This vent consists of a disc-shaped cap over a vent opening, a thin membrane covering the opening and a layer of fusible material between the membrane and the cap. The cap is provided with a pointed projection which punctures the flexible membrane after the fusible material has melted.

U.S. Pat. No. 4,855,195 discloses electrochemical cells that employ a current collector-safety switch member comprised of a shape memory alloy in the electric circuit in the cell. The collector-safety switch member has a base portion and a plurality of legs extended therefrom and when the internal temperature of the cell rises, the legs of the collector-safety switch member are retracted to thereby disconnect the electrical circuit in the cell. These cells can also be comprised of a resettable thermal switch for inhibiting the flow of current in the cell at a temperature below the disconnect temperature of the current collector-safety switch member.

In U.S. Pat. No. 4,975,341 an electrochemical cell is disclosed which employs a resettable or nonresettable safety disconnect device operable by a shape memory alloy element. The shape memory alloy element is preferably in the form of an accordion or coiled configuration that will be extended in normal operation of the cell and contract when the internal temperature exceeds a preselected value whereupon the shape memory alloy will break contact in the electrical circuit of the cell thereby rendering the cell inoperative.

It is an object of the present invention to provide a safety circuit disconnect device for use in electrochemical cells.

It an another object of the present invention to provide an externally mounted safety circuit disconnect device that can operate reliably to break the electronic contact with a terminal of the cell when the cell is subjected to abuse conditions which increase the temperature within the cell above a predetermined level.

It is another object of the present invention to provide a circuit disconnect device that employs a heat fusible conductive material that is easy to produce and cost effective to use in the cell.

The foregoing and additional objects will become fully apparent from the following description and the accompanying drawings.

DISCLOSURE OF THE INVENTION

This invention relates to an electrochemical cell comprising an electrode assembly containing at least one positive electrode and at least one negative electrode; a housing containing the electrode assembly and containing first means for providing a terminal on the housing for one of the said positive and negative electrodes; a cover for the housing and an insulating member for insulating the cover from the housing; second means within the housing for providing a terminal on the cover for the opposite electrode; a conductive member placed over the exterior of one terminal and electronically connected to and secured to said one terminal using a heat fusible conductive material thereby adapting said conductive member as an external terminal for said one terminal; means for exerting a force against said conductive member to separate said conductive member from said one terminal but said heat fusible conductive material providing a stronger securement of said conductive member to said one terminal; and wherein said heat fusible conductive material is selected to melt when the temperature at the area of the heat fusible conductive material exceeds a predetermined amount whereupon said means exerting a force against said conductive member will separate said conductive member from said one terminal thereby breaking the electronic contact between said conductive member and said one terminal.

The heat fusible conductive material for use in this invention can be any conducting material that will fuse upon being heated to provide a good bond and then melt at a relatively low temperature. The temperature at which the heat fusible material melts should be selected such that for a cell employing a compression seal and a compressible seal material, such as a polymeric seal material, the temperature reached will not be high enough to damage the seal material. For a cell containing a lithium or lithium alloy anode, the temperature reached should not be high enough to melt the anode. Examples of heat fusible materials would include low melting point conductive metal alloys and conductive adhesives. The requirement of the heat fusible material is that it be conductive and fuse upon heating to provide a good securing bond between two surfaces. The preferred heat fusible materials would be low melting point conductive alloys such as low melting conductive solder. The preferred low melting conductive solders for use in this invention are bismuth-lead-cadmium, bismuth-tin-lead and indium-tin. For most applications employing compression seals of nylon or polytetrafluoroethylene, the heat fusible material should have a melting point of 85° C. to 110° C., preferably between 85° C. to 95° C. For use in lithium cell systems employing a glass-to metal seal, the heat fusible material should have a melting point of from 90° C. to 150° C., preferably about 100° C. to 125° C.

One advantage of the circuit cutoff device of this invention is that the terminal cutoff is exterior to the cell environment and therefore electrolyte and/or electrolyte vapor within the cell cannot prematurely escape from the cell and cause damage to the device employing the cell or to the heat fusible material securing the external terminal to the cell. The thermal cutoff device of this invention operates as a thermal cutoff when the cell becomes hot as well as an "electrical fuse" type device that reacts when the current causes sufficient $I^2R$ heat to melt the heat fusible material. The cutoff device will break the circuit of the cell when the heat fusible material melts at a specific temperature which then allows a force means, such as a compressed spring, to move the external terminal away from a terminal of the cell thereby breaking electronic contact with the cell. The design of the cutoff device of this invention would respond to excessive heat build up and function properly under the following three abuse conditions:

(1) External shorting of a cell.

(2) A cell with a lower capacity or one incapable of handling the current of remaining cells in a battery so that the cell would be force-discharged.

(3) Electrical abuse of unit cells not assembled in a battery pack.

In the preferred embodiment of this invention the conductive member would be placed over the cover, preferably at the center of the cover, of the cell. The conductive member would resemble a hat-shaped configuration in which the flange or rim would be electronically and physically secured to the cover of the cell using a heat fusible conductive material thereby adapting the conductive member as an external terminal for the cell via the cover. The hollow space within the conductive member would preferably contain a compressed spring which would exert a force to separate the conductive member from the cover. Since most springs are conductive, an insulating layer or sheet could be placed within the conductive member between the spring and the inner wall of the conductive member. Thus when the temperature exceeds a predetermined level at the vicinity of the heat fusible material, which could originate from within or without the cell, the heat fusible material would melt and the compressed spring would force the conductive member away from the cover thereby breaking the electronic connection between the cover and the conductive member. If the spring means were an insulating member, the insulating layer or sheet would not have to be used. For example, a conductive spring could be coated with an insulated layer or the inner surface of the conductive member that is in contact with the spring could be painted with an insulating coating.

In another preferred embodiment of the invention, a glass-to-metal seal could be used in the cover of the cell. In this arrangement, an inverted hat-shaped conductive member electronically connected to one electrode of the cell could be inserted into and sealed to a glass ring secured to the cover of the cell. A compressed spring could be employed within the hat-shaped conductive member and positioned to exert pressure against an external conductive terminal member secured to the rim or flange of the hat-shaped conductive member using a heat fusible conductive material. Again, if the spring is a conductive member, then an insulating member would have to be disposed between the spring and the external conductive terminal member. Thus when the temperature at the heat fused bond exceeds a predetermined value, the heat fused material, such as solder, will melt and the compressed spring will exert force against the external conductive terminal member to electronically and physically separate it from the hat-shaped conductive member thereby breaking the electronic contact between the external terminal and an electrode in the cell's housing. In some applications it may be desirable to have the external conductive terminal secured to the spring means via the insulated member so that when the heat fusible material melts, the external conductive terminal will break electronic contact with the cell system but will remain secured to the cell. In the preferred embodiments of the invention where the external conductive terminal is placed over the cover, such external conductive terminal should be preferably positioned at the center of the cover so that it will be in a position to react quickly to internal temperature changes in the cell.

Any combination of positive and negative electrodes suitable to provide an electrical circuit in the cell can be used in the cells of this invention. Examples of suitable combinations are a stacked assembly, plate assembly, and spirally wound assembly. Preferably, the electrode assembly used in the cells of this invention would be spirally wound electrode assemblies. Typically, such an assembly has a negative electrode strip comprising an anode material and a positive electrode strip comprising a cathode material or a cathode collector for liquid cathode systems, separated by a separator strip. Useful anode materials are consumable metals, such as aluminum, zinc, the alkali metals, alkaline earth metals, and alloys of alkali metals and alkaline earth metals. Preferred anode materials for nonaqueous electrolyte systems include aluminum, lithium, sodium, and calcium. Preferably, the anode material for such systems is lithium because it is a ductile soft metal and possesses the highest energy-to-weight ratio of the group of suitable anode metals. Lithium can be utilized as a strip or can be applied to a suitable carrier. After being formed into the strip, the electrode will typically have an anode collector portion extending on one edge of the strip.

The coiled electrode assembly can be used in many different types of cell systems such as aqueous (i.e. alkaline) or nonaqueous cell systems employing solid or liquid cathodes. When the coiled electrode assembly is employed in lithium nonaqueous cells, it would sometimes be preferable to make the lithium the outer wound electrode strip. The lithium electrode could be superimposed and overlaid on a cathode strip having an active material such as $MnO_2$, CuO, $CF_x$, $FeS_2$, $TiS_2$ or the like on a suitable carrier with a separator interposed between them, and then wound with the edge of both electrode strips protruding from opposite ends of the coiled electrode assembly. In liquid cathode cells, the lithium would be superimposed and overlaid on a cathode collector strip.

The separator for use in the cell system could be selected from a number of ionically permeable materials such as porous polypropylene or polyethylene woven or nonwoven glass fiber mats and coated papers.

Cathode collectors suitable for use in a liquid cathode system would be sintered nickel or carbonaceous materials such as polytetrafluoroethylene-bonded carbon or the like. Cathode current collectors suitable for use in solid cathode systems include metal foils, metal screens and expanded metal. Anode current collectors suitable for use in the invention would be nickel foil, stainless steel foil, expanded metal, perforated metal or the like.

Suitable electrolytes for use in the cells of this invention can be aqueous or nonaqueous. Nonaqueous electrolytes can employ organic or inorganic solvents containing a conductive solute. Suitable solvents include tetrahydrofuran (THF), dioxolane, dimethoxyethane (DME), dimethyl isoxazole (DMI), 3-methyl-2-oxazolidone, diethyl carbonate (DEC), propylene carbonate, ethylene glycol sulfite (EGS), dioxane, dimethyl sulfite (DMS), or the like and mixtures thereof.

Suitable salts include: $MCF_3SO_3$, MSCN, $MBF_4$, $MClO_4$ and $MM'F_6$ wherein M is lithium, sodium or potassium, and M' is phosphorus, arsenic or antimony. The particular salt selected is compatible and non-reactive with the solvent and the electrodes of the cell. The amount of salt to be added to the solvent should be sufficient to provide an ionically conductive solution with a conductivity of at least about $10^{-4} ohm^{-1} cm^{-1}$. Typically, about 0.5 M of the salt will be sufficient. An example of a preferred electrolyte is a mixture of dioxolane, propylene carbonate, and dimethoxyethane, and $LiClO_4$.

The housing of the cells of this invention may be comprised of an electrically conductive material such as metal or a plastic substrate coated with a metal. The housing contains a means for providing a terminal for one of the electrodes. Preferably, the housing has an open end and a closed end and is cylindrical. The housing itself can contact one of the electrodes to provide a terminal.

The cover assembly also contains a means for providing the terminal opposite in polarity from the terminal provided by the housing. In some applications, the cover assembly further comprises a means for sealing and insulating the cover assembly from the cell housing and a seal-vent assembly including a means for venting the cell.

Any insulating gasket member disposed between a cover and the cell housing has to be stable in the presence of the active components and discharge products and can be selected from such materials as nylon, polypropylene, polyethylene, polytetrafluoroethylene, fluorinated ethylenepropylene polymer, ethylene copolymer with fluorinated ethylenepropylene, polyester, polychlorotrifluoroethylene, perfluoroalkoxy polymer and the like.

Anode materials suitable for use in this invention could be lithium, calcium, magnesium, sodium, zinc, cadmium and the like. Cathode materials suitable for use in this invention could be solid materials such as $MnO_2$, HgO, $Ag_2O$, CuO, $Ni(OH)_2$, $FeS_2$, $TiS_2$, $(C_2F)_n$, $(CF_x)_n$ with x greater than 0 and less than 1.1, and liquid material such as $SOCl_2$, $SO_2Cl_2$ and $SO_2$. Some preferred cell systems for use in this invention would be as shown in the Table below.

TABLE

| Anode | Cathode | Electrolyte |
| --- | --- | --- |
| lithium | $MnO_2$ | organic |
| lithium | $SOCl_2$ | $LiAlCl_4$ in $SOCl_2$ |
| lithium | $(CF_x)_n$ | organic |
| zinc | $MnO_2$ | aqueous alkaline |
| cadmium | nickel hydroxide | aqueous alkaline |

When the anode for use in this invention is lithium, then a lithium foil could be secured onto a metallic conductive foil or carrier (anode current collector) such as nickel or stainless steel.

The foregoing and additional objects will become more fully apparent from the description hereinafter and the accompanying drawings.

DESCRIPTION OF THE PREFERRED EMBODIMENTS

Figure 1:
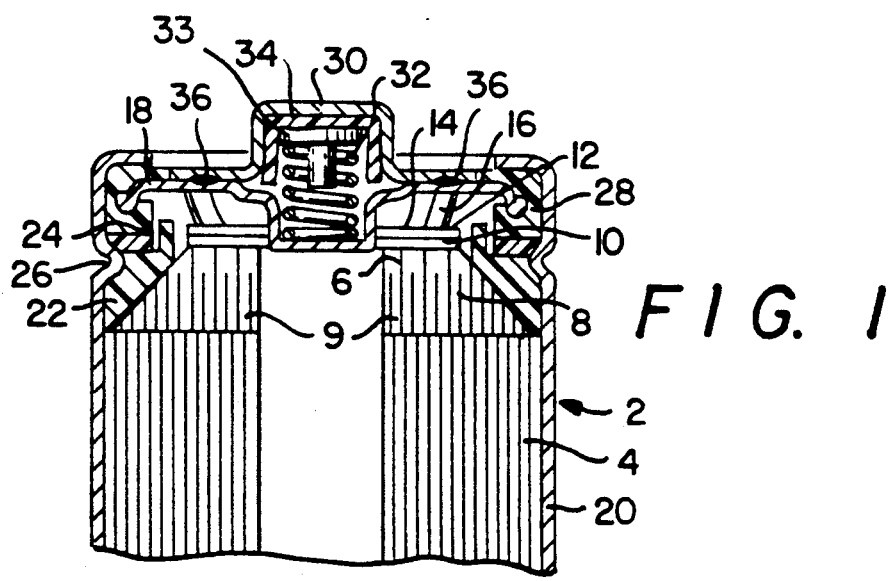
FIG. 1 is a vertical cross-sectional view of the upper portion of an electrochemical cell made in accordance with the present invention and employing a spirally wound electrode assembly and a heat sensitive circuit disconnect device.

FIG. 1 shows an electrochemical cell 2 having a spirally wound electrode assembly 4 prepared by superimposing and overlapping a first electrode strip 6 onto a second electrode strip 8 with an insulating separator 9 between electrode strip 6 and electrode strip 8. The edges of electrode strip 6 extend at the top end of cell 2 to contact conductive ring 10. Disposed on top of conductive ring 10 is a conductive member 12, preferably made of a spring material, having a base portion 14 in contact with ring 10 and having upwardly extending legs 16 contacting a conductive cover 18. The cell is assembled by placing the spirally wound electrode assembly 4 into conductive container 20. An insulating cone 22 is then placed on top of the spirally wound electrode assembly 4 following by a ring support 24 placed on cone 22 above a bead 26 in the container 20.

An insulating gasket 28 is employed to provide a fluid- and air-tight seal between cover 18 and container 20. A terminal member 30 is placed on top of conductive cover 18 to serve as external terminal for electrode strip 6. In this arrangement electrode strip 6 is in electronic contact with terminal member 30 via conductive ring 10, conductive member 12 and conductive cover 18 thereby adapting terminal member 30 as the external terminal for electrode strip 6. Disposed between cover 18 and conductive terminal member 30 is a compressed spring 32 which exerts force against a rivet type member 33 which in turn exerts force against insulator member 34 which in turn exerts force against conductive terminal member 30. Terminal member 30 is electronically and physically secured to cover 18 by heat fusible conductive material (i.e., solder) 36. The heat fusible conductive material is selected with a low melting point so that when the temperature at this bonded area exceeds a predetermined level, the spring 32 will force terminal 30 away from cover 18 via member 33 and insulative member 34, thereby breaking electronic contact between the cover 18 and terminal 30.

Figure 2:
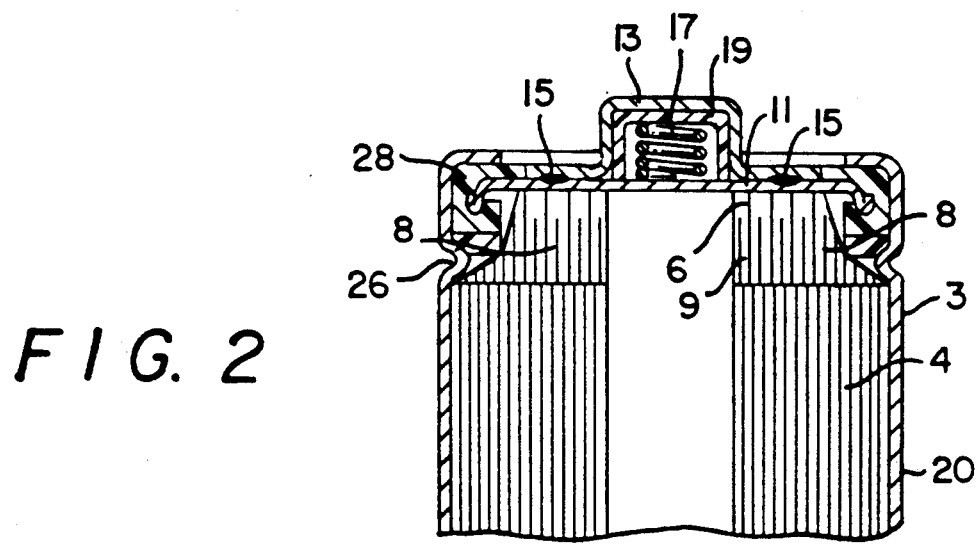
FIG. 2 is a vertical cross-sectional view of another embodiment of the upper portion of an electrochemical cell made in accordance with the present invention and employing a spirally wound electrode assembly and a heat sensitive circuit disconnect device.

FIG. 2 shows another embodiment of an electrochemical cell of this invention in which like components shown in FIG. 2 are identified with the same reference numbers. FIG. 2 shows a spirally wound electrode assembly 4 in a cell 3 prepared by superimposing and overlapping a first electrode strip onto a second electrode strip 8 with an insulating separator 9 between electrode strip 6 and electrode strip 8. The edges of electrode strip 6 extend at the top end of cell 3 to contact cover 11 thereby adapting cover 11 as the terminal for electrode strip 6. A conductive terminal 13, hat-shaped, is placed over the center of cover 11 and electronically secured to cover 11 using a heat fusible material 15. This arrangement makes terminal 13 the external terminal for electrode strip 6. Disposed between terminal 13 and cover 11 is compressed spring 17. As shown in FIG. 2, spring 17 is electronically insulated from the inner surface of terminal 13 by an insulative member 19. Again the heat fusible material 15 is selected with a low melting point so that when the temperature at this bonded area exceeds a predetermined level, the spring 17 will force external terminal 13 away from cover 11 via insulative member 19 thereby breaking electronic contact between the cover 11 and external terminal 13.

Figure 3:
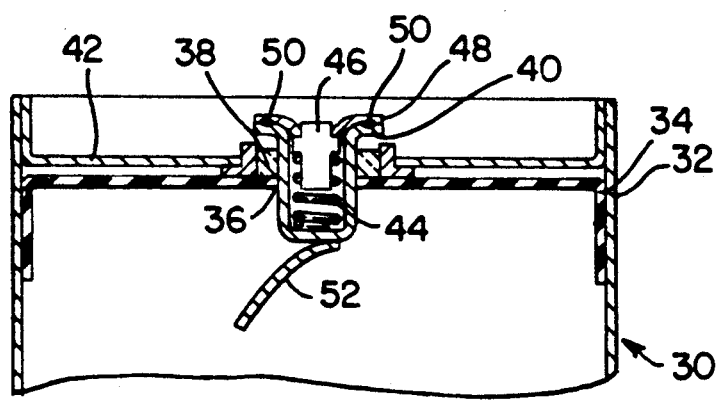
FIG. 3 is a vertical cross-sectional view of another embodiment of the upper portion of an electrochemical cell employing a glass-to-metal seal along with a heat sensitive circuit disconnect device in accordance with this invention.

FIG. 3 shows a cell 30 employing a container 32 having an insulating member 34 disposed adjacent to the top portion of the inner wall of container 32. Member 34 defines an opening 36 in the center onto which is seated a glass-to-metal seal 38 which seals cover 40 to container 32 via member 42, said member 42 being welded to container 32. The cover 40 is an inverted hat-shaped member which contains a compressed spring 44 exerting force against an insulative member 46 which in turn exerts a force against a conductive terminal ring 48 secured to the outer rim of hat-shaped member 40 by a heat fusible material 50. Although not shown, hat-shaped member 40 (cover) is electronically connected to one of the electrodes in the cell by conductive member 52. Thus, conductive terminal ring 48 is electronically connected to one electrode of the cell. Again the heat fusible material 50 is selected with a low melting point so that when the temperature at this bonded area exceeds a predetermined level, the spring 33 will force terminal ring 48 via insulative member 46 away from hat-shaped member 40 thereby breaking electronic contact between hat-shaped member 40 and terminal ring 48.

Although preferred embodiments of this invention have been described in detail, it is contemplated that modifications and changes to the preferred embodiments of the invention herein shown and described can be made without departing from the spirit and scope of the invention.

What is claimed:

1. An electrochemical cell comprising an electrode assembly containing at least one positive electrode and at least one negative electrode; a housing containing the electrode assembly; a cover for the housing and an insulating member for insulating the cover from the housing; a means within the housing for placing the cover in electronic contact with one of the electrodes; a conductive member placed over the exterior of and electronically connected to and secured to said cover using a heat fusible conductive material so that said conductive member is an external terminal for said one electrode; means for exerting a force against said conductive member to separate said conductive member from said cover but said heat fusible conductive material providing a stronger securement of said conductive member to said cover; and wherein said heat fusible conductive material is selected to melt when the temperature at the area of the heat fusible conductive material exceeds a predetermined level whereupon said means exerting a force against said conductive member will separate said conductive member from said cover thereby breaking the electronic contact between said conductive member and said cover.

2. The electrochemical cell of claim 1 wherein the means for exerting a force against said conductive member is spring means.

3. The electrochemical cell of claim 1 wherein said spring means is conductive and an insulating member is placed between said spring means and the internal surface of said conductive member.

4. The electrochemical cell of claim 1 wherein said heat fusible conductive material is a low melting point metal alloy.

5. The electrochemical cell of claim 1 wherein said heat fusible conductive material is a conductive adhesive.

6. The electrochemical cell of claim 4 wherein said low melting point metal alloy is selected from the group consisting of bismuth-lead-cadmium; bismuth-lead-tin and indium-tin.

7. The electrochemical cell of claim 1 wherein the cover is secured to the cell housing by a glass-to-metal seal.

8. The electrochemical cell of claim 7 wherein the heat fusible conductive material has a melting point of from 90° C. to 150° C.

9. The electrochemical cell of claim 7 wherein the electrode assembly is a lithium-SOCl$_2$ electrode assembly and said heat fusible conductive material has a melting point of from 100° C. to 125° C.

10. The electrochemical cell of claim 1 wherein the cover is secured to the cell housing by a compression seal.

11. The electrochemical cell of claim 10 wherein said heat fusible conductive material has a melting point from 85° to 110° C.

12. The electrochemical cell of claim 11 wherein said heat fusible conductive material has a melting point of from 85° C. to 95° C.

13. The electrochemical cell of claim 9 wherein the lithium is electronically connected to the housing thereby adapting said housing as the lithium terminal for the cell.

14. The electrochemical cell of claim 13 wherein the means for exerting a force against said conductive member is spring means.

15. The electrochemical cell of claim 14 wherein said spring means is conductive and an insulating member is placed between said spring means and the internal surface of said conductive member.

16. The electrochemical cell of claim 15 wherein said heat fusible material is a low melting point metal alloy.

17. The electrochemical cell of claim 1 wherein said electrode assembly is a lithium - $MnO_2$ or lithium $FeS_2$ electrode assembly.

18. The electrochemical cell of claim 17 wherein the cover is secured to the housing in a glass-to-metal seal and wherein said heat fusible material has a melting point of 90° C. to 150° C.

19. The electrochemical cell of claim 18 wherein said heat fusible material has a melting temperature of from 100° C. to 125° C.

20. The electrochemical cell of claim 17 wherein the cover is secured to the cell housing by a compression seal and said heat fusible material has a melting point of 85° C. to 110° C.

* * * * *